United States Patent
Xu et al.

(10) Patent No.: US 11,049,271 B2
(45) Date of Patent: Jun. 29, 2021

(54) DEPTH CALCULATION PROCESSOR, DATA PROCESSING METHOD AND 3D IMAGE DEVICE

(71) Applicant: ORBBEC INC., Guangdong (CN)

(72) Inventors: Xing Xu, Guangdong (CN); Zhenzhong Xiao, Guangdong (CN); Xiaolu Mei, Guangdong (CN); Sheng Xu, Guangdong (CN); Yuanhao Huang, Guangdong (CN); Xu Chen, Guangdong (CN)

(73) Assignee: Orbbec Inc., Shenzhen (CN)

( * ) Notice: Subject to any disclaimer, the term of this patent is extended or adjusted under 35 U.S.C. 154(b) by 39 days.

(21) Appl. No.: 16/438,246

(22) Filed: Jun. 11, 2019

(65) Prior Publication Data

US 2019/0295271 A1 Sep. 26, 2019

Related U.S. Application Data

(63) Continuation of application No. PCT/CN2017/089034, filed on Jun. 19, 2017.

(30) Foreign Application Priority Data

Apr. 17, 2017 (CN) .......................... 201710249233.9

(51) Int. Cl.
*G06K 9/00* (2006.01)
*G06T 7/521* (2017.01)

(52) U.S. Cl.
CPC .......... *G06T 7/521* (2017.01); *G06K 9/00255* (2013.01); *G06K 9/00275* (2013.01);
(Continued)

(58) Field of Classification Search
CPC ........... G06T 7/521; G06T 2207/20228; G06T 2207/10048; G06T 2200/28; G06K 9/00255; G06K 9/00275; G06K 2209/401
(Continued)

(56) References Cited

U.S. PATENT DOCUMENTS

| | | | | |
|---|---|---|---|---|
| 5,852,672 | A | * | 12/1998 | Lu ...................... G01B 11/2441 382/154 |
| 9,971,937 | B1 | * | 5/2018 | Ovsiannikov ........... G06F 21/32 |

(Continued)

FOREIGN PATENT DOCUMENTS

| CN | 101056394 A | 10/2007 |
|---|---|---|
| CN | 103313032 A | 9/2013 |
| CN | 103428516 A | 12/2013 |

OTHER PUBLICATIONS

PCT International Search Report and the Written Opinion dated Jan. 16, 2018, issued in related International Application No. PCT/CN2017/089034 (9 pages).

(Continued)

*Primary Examiner* — Sheela C Chawan
(74) *Attorney, Agent, or Firm* — Sheppard Mullin Richter & Hampton LLP

(57) ABSTRACT

A depth calculation processor, a data processing method, and a 3D image device are disclosed herein. The depth calculation processor includes: two input ports to receive a first image data, wherein the first image data comprises structured light image acquired under projection of structured light; an input switch connected to the input ports and to convey all or some of the first image data from the input ports; a data processing engine connected to the input switch and to process the first image data that is output through the input switch and to output a second image data, wherein the second image data comprises a depth map, wherein the data processing engine comprises a depth processing engine to (Continued)

process the structured light image to obtain the depth map; and one output port connected to the data processing engine and to output the second image data to a main device.

20 Claims, 5 Drawing Sheets

(52) U.S. Cl.
CPC ............... *G06T 2200/28* (2013.01); *G06T 2207/10048* (2013.01); *G06T 2207/20228* (2013.01)

(58) Field of Classification Search
USPC ........ 382/100, 106, 154; 345/418, 419, 421, 345/422; 348/E13.001, E13.002, 348/E13.026, E13.059, E13.022
See application file for complete search history.

(56) References Cited

U.S. PATENT DOCUMENTS

| | | | |
|---|---|---|---|
| 10,089,740 B2* | 10/2018 | Srikanth | H04N 5/232935 |
| 10,182,216 B2* | 1/2019 | Mullis | H04N 9/093 |
| 10,390,005 B2* | 8/2019 | Nisenzon | G06T 7/593 |
| 2012/0242795 A1* | 9/2012 | Kane | H04N 13/271 348/46 |
| 2013/0236120 A1 | 9/2013 | Choi et al. | |
| 2013/0307937 A1 | 11/2013 | Kim | |

OTHER PUBLICATIONS

PCT International Preliminary Report on Patentability dated Oct. 31, 2019, issued in related International Application No. PCT/CN2017/089034, with English machine translation (10 pages).

* cited by examiner

DEPTH CALCULATION PROCESSOR, DATA PROCESSING METHOD AND 3D IMAGE DEVICE

CROSS-REFERENCE TO RELATED APPLICATIONS

This is a continuation of International Application No. PCT/CN2017/089034, filed on Jun. 19, 2017, which is based on and claims priority to and benefits of Chinese Patent Application No. 201710249233.9, filed with the State Intellectual Property Office (SIPO) of the People's Republic of China on Apr. 17, 2017. The entire contents of all of the above-identified applications are incorporated herein by reference.

TECHNICAL FIELD

The present disclosure relates to the field of computer and microelectronic, specifically relates to a depth calculation processor and a data processing method thereof, and further relates to a three-dimensional (3D) image device.

BACKGROUND

A depth camera is used to obtain three-dimensional depth information of an object. Applications such as three-dimensional modeling, recognition, and human-computer interaction may be performed by using the depth information. The depth information is further used for 3D printing, facial recognition payment, simultaneous localization and mapping (SLAM), motion sensing operation, and the like. In a solution of a conventional depth camera, a structured light depth camera is commonly used. A principle of the solution includes projecting the structured light with a particular mode to a target object, using a dedicated depth calculation chip to analyze an acquired structured light pattern to obtain depth information of the target object. The dedicated depth calculation chip is configured to implement a function of depth data calculation and processing function, featuring high integration and low power consumption, so that the depth camera can obtain a real-time high resolution depth image of the target object.

As being widely adopted to various applications, the depth camera is gradually changed from a single independent device to an embedded device. For example, the depth camera is integrated into a host device such as a computer, a tablet, a mobile phone, a robot, or a drone, to allow these host devices to have 3D images, thereby expanding the functions of the host devices greatly. In addition, applications for the depth camera are also increasing to include, for example, indoor applications including living room entertainment based on the depth camera and a service robot having a 3D vision, and outdoor applications including the drone or the mobile phone.

Different host devices and application scenarios have different performance requirements for depth cameras. A depth camera usually needs to be customized according to a specific application. It is generally easier and cost-effective to customize a projector and an image acquisition unit in the depth camera. However, it takes a long time and costs more to customize a depth calculation processing chip for a depth camera. In conventional technologies, the depth calculation processing chip can be used in only a few host devices, and can only perform fewer functions. Consequently, it is difficult to satisfy requirements of a plurality of applications.

SUMMARY

An objective of the present disclosure is to provide a depth calculation processor that is applicable to a plurality of host devices and can implement a plurality of functions, so as to resolve the technical problems of conventional depth calculation processing chips that have only a simple function and a narrow application range, and needs to be customized according to a specific application.

To resolve the foregoing technical problems, embodiments of the present disclosure provides the following technical solutions.

In one aspect, a depth calculation processor is provided. The depth calculation processor includes at least two input ports used to receive a first image data. The first image data comprises at least a structured light image acquired under projection of structured light. The depth calculation processor further includes an input switch coupled to the input ports and used to convey all or some of the first image data from the input ports. A data processing engine is coupled to the input switch, and is used to perform a calculation process on the first image data that is output through the input switch so as to output a second image data. The second image data comprises at least a depth map. The data processing engine includes at least a depth processing engine used to process the structured light image to obtain the depth map. The depth calculation processor further includes at least one output port coupled to the data processing engine and used to output the second image data to a host device.

In the depth calculation processor provided in the present disclosure, a plurality of input ports may be used to support simultaneous inputting of a plurality of types of image data, and the image data input is selected and combined by the input switch, for the data processing engine to perform a calculation process. For different types of image data and different combinations of the image data, the data processing engine may perform different calculation processes and output a plurality of different images, so as to implement a plurality of functions. In addition, a plurality of output ports is configured to adapt to different host devices. It can be learned that the depth calculation processor of the present disclosure is applicable to a plurality of host devices. Compared with a host device with a plurality of single functioned processors, the overall volume and power consumption of the host device are reduced.

In a second aspect, the present disclosure further provides a data processing method. The data processing method includes independently receiving a first image data from different image sensors through at least two input ports. The first image data comprises at least a structured light image acquired under projection of structured light. The data processing method further includes selectively receiving the first image data from the input ports, performing a calculation process on the first image data to obtain a second image data, and outputting the second image data to a host device through at least one output port. Performing the calculation process on the first image data includes performing a depth calculation process on the structured light image to obtain a depth map.

In a third aspect, the present disclosure further provides a 3D image device. The 3D image device includes a depth calculation processor, a projector, and a first image acquisition unit. The projector is coupled to the depth calculation processor and used to generate a structured light pattern under control of the depth calculation processor. The structured light pattern being projected to a target object. The first image acquisition unit coupled to the depth calculation processor and used to acquire a structured light image of the target object and output the structured light image of the target object to the depth calculation processor. The depth calculation processor includes at least two input ports used to receive the structured light image. An input switch is coupled to the input ports and used to convey all or some of the structured light image from the input ports. A data processing engine is coupled to the input switch and used to perform a calculation process on the structured light image to generate an output image. The output image includes a depth map. The data processing engine comprises at least a depth processing engine used to perform a depth calculation process on the structured light image to obtain the depth map. At least an output port is coupled to the data processing engine and used to output the output image to a host device.

DETAILED DESCRIPTION OF THE EMBODIMENTS

The present disclosure is further described below with reference to the accompanying drawings and specific implementations.

Figure 1:
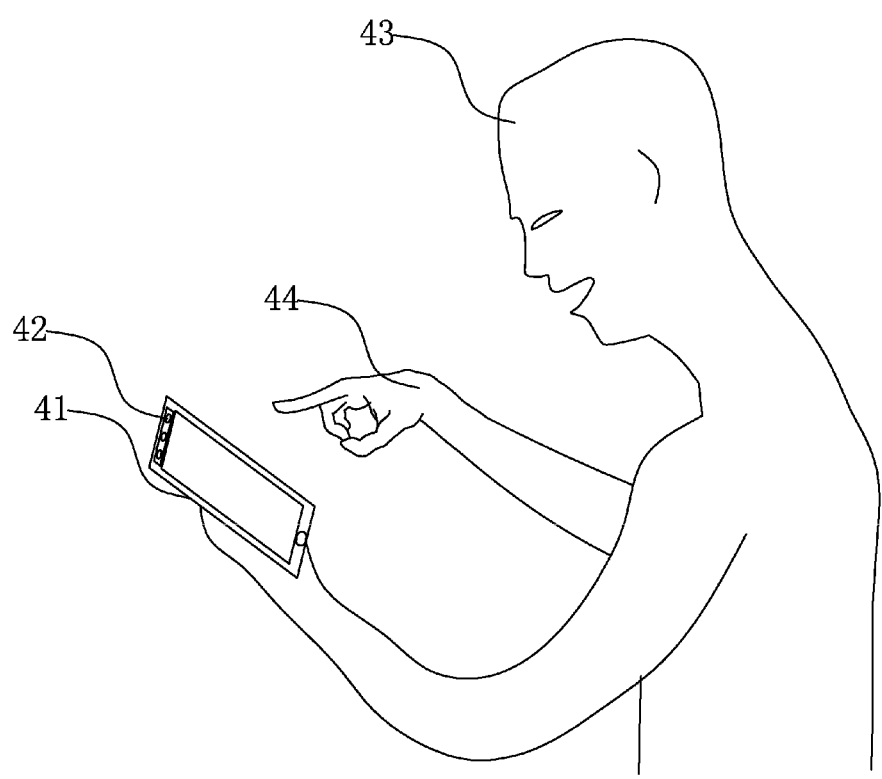
FIG. 1 is a schematic diagram illustrating an application scenario of a mobile terminal having a depth camera according to an embodiment of the present disclosure.

FIG. 1 is a schematic diagram of an application scenario of a mobile terminal having a depth camera according to an embodiment of the present disclosure. In FIG. 1, a user 43 holds a mobile phone 41, and operates the mobile phone 41 with a hand 44. Alternatively, the mobile phone 41 herein may be another mobile terminal device, such as a tablet or a personal computer, or more broadly, may be a computing device having functions such as independent computation and displaying. The front of mobile phone 41 is provided with a front-facing depth camera 42 that can be used to obtain depth information of a target object.

The depth camera 42 projects a structured light pattern to a target space. The structured light pattern can be a fixed pattern obtained through special encoding, and is generally an invisible light pattern such as an infrared laser pattern or an ultraviolet laser pattern. The depth camera 42 acquires, by using an image sensor of the depth camera 42, a structured light pattern modulated by a target. Then the modulated structured light pattern is processed by an internal depth calculation chip in the depth camera 42 to obtain a depth image of the target. Each pixel value in the depth image indicates a distance between a point of the target and the image sensor. Further, three-dimensional coordinate information of each pixel in an image sensor coordinate system, i.e., the point cloud data of the target, can be obtained according to parameters of the image sensor and depth information of each pixel. According to the point cloud data, 3D image-based functions, such as three-dimensional reconstruction, human body recognition, skeleton extraction, and posture and movement recognition can be achieved. For example, in FIG. 1, the user 43 can operate the mobile phone 41 through mid-air gestures of the hand 44.

In an embodiment of the present disclosure, in addition to obtaining a depth image, the depth camera 42 may further obtain an RGB image of the target, thereby implementing some RGB image-based applications such as obtaining a self-portrait. In some embodiments, the depth camera 42 may be further configured to provide an invisible light image such as an infrared image. Because of the anti-interference ability to ambient light of an infrared image, the host device may have a very robust function of infrared image-based facial recognition. In some applications, it is also necessary to register a depth image, an RGB image and an infrared image. For example, a RGBD (RGB-depth) image may be used to enable a three-dimensional model to have color information, or an IRD (infrared-depth) image is used to implement two-dimensional or three-dimensional facial feature recognition.

A depth camera may be a 3D image device. When configured with a depth camera, a mobile terminal may implement the above 3D image-based functions based on output of the depth camera. Therefore, the mobile terminal may also be considered as a 3D image device.

A specific implementation of the present disclosure provides a 3D image device including a depth calculation processor, a projector, and a first image acquisition unit. The projector is coupled to the depth calculation processor, and generates a structured light pattern to be projected to a target object under control of the depth calculation processor. The first image acquisition unit is coupled to the depth calculation processor and is used to acquire and output a structured light image of the target object to the depth calculation processor. The depth calculation processor can perform a depth calculation process on the structured light image to generate a depth image. As described above, the 3D image device may be a depth camera, or a mobile terminal having the depth camera. When the 3D image device is a mobile terminal, it may further include an application processor.

Figure 2A:
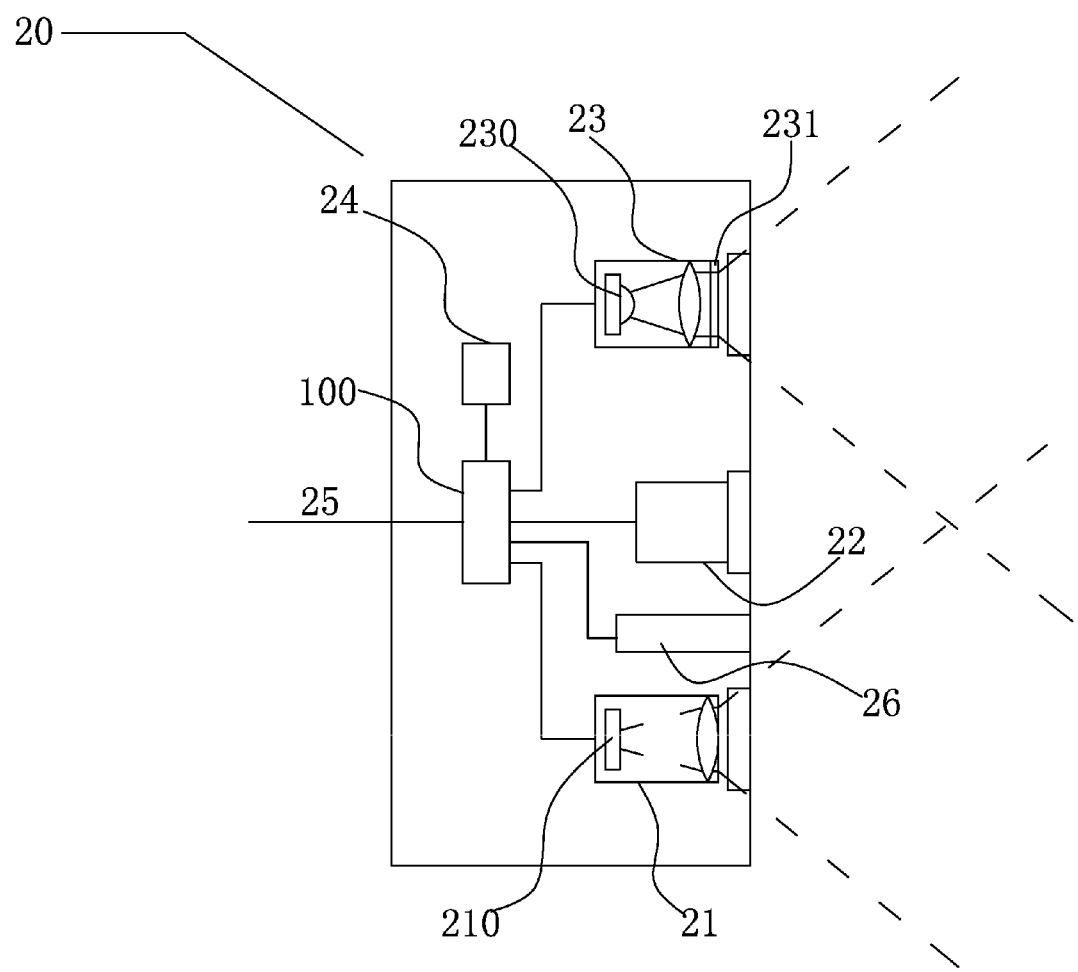
FIG. 2A is a schematic diagram of a depth camera according to an embodiment of the present disclosure.
Figure 2B:
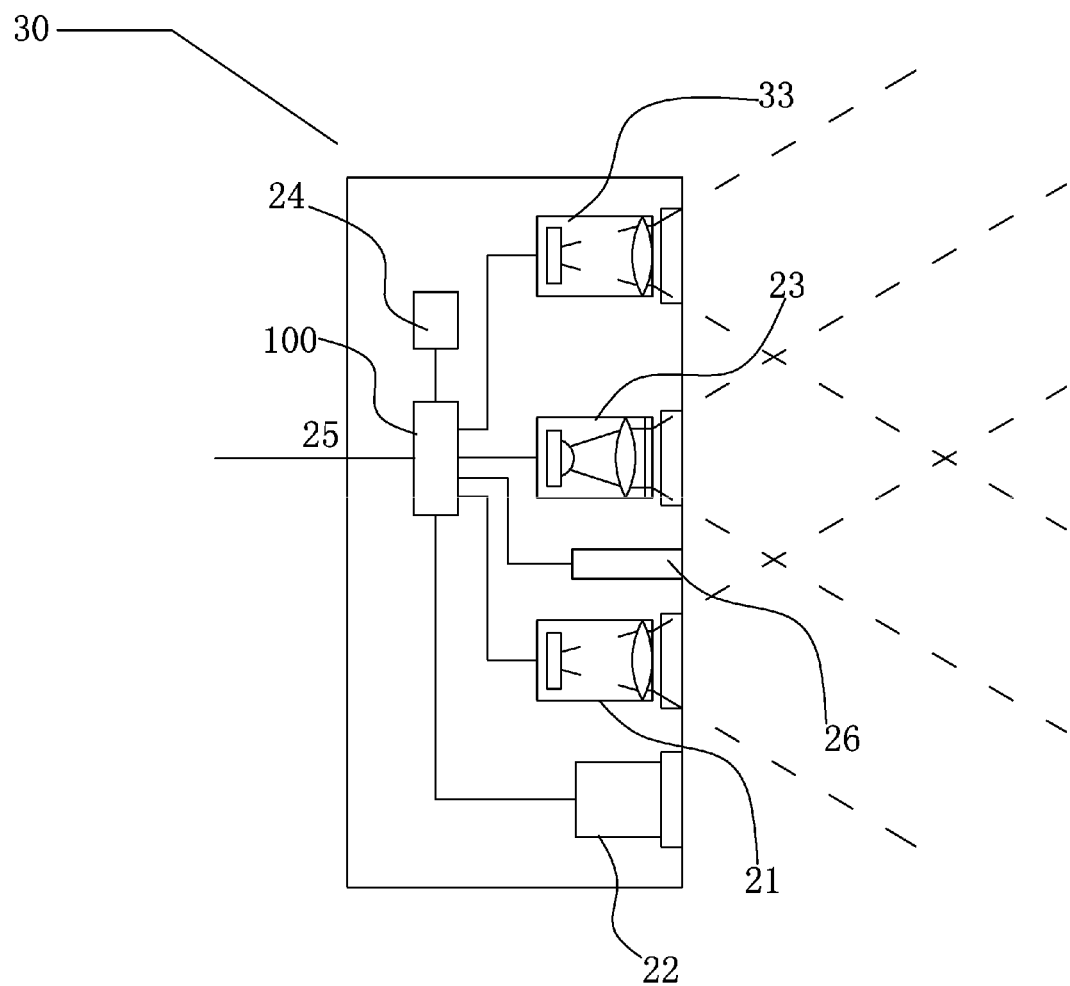
FIG. 2B is a schematic diagram of another depth camera according to an embodiment of the present disclosure.

As a specific form of a 3D image device, a depth camera may be used in the mobile terminal 41 shown in FIG. 1 and can have two different modes. FIG. 2A and FIG. 2B illustrate the depth cameras with two different modes, respectively. Those embodiments are provided as examples and do not indicate that the depth camera of the present disclosure has only two modes shown in the figures.

The depth camera 20 shown in FIG. 2A includes a depth calculation processor 100, a first image acquisition unit 21, a second image acquisition unit 22, a projector 23, a memory 24, and a transmission interface 25. The depth calculation processor 100 is coupled to the first image acquisition unit 21, the second image acquisition unit 22, the projector 23, and the memory 24. The projector 23 is used to project a structured light pattern to a target object. The projector 23 includes a light source 230, a lens, and a structured light pattern generation component 231. The light source 230 may be a surface-emitting laser array or a vertical cavity surface emitting laser (VCSEL) array. The pattern generation component 231 may be frosted glass, a diffractive optical element (DOE), or a combination thereof.

Figure 3:
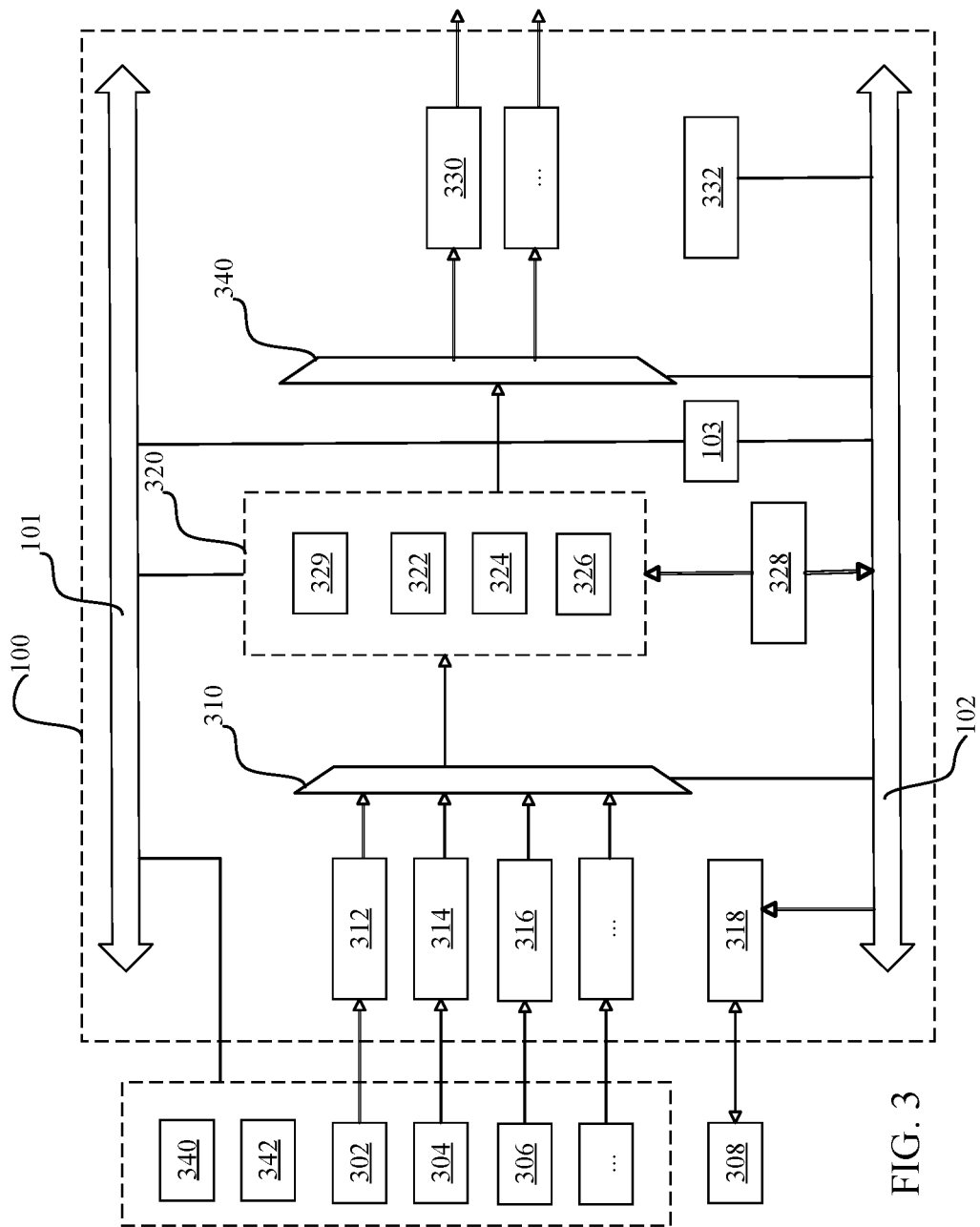
FIG. 3 is a block diagram of a depth calculation processor according to an embodiment of the present disclosure.

As shown in FIG. 3, the depth calculation processor 100 includes at least two input ports 312, 314, 316, an input switch 310, a data processing engine 320, and at least one output port 330. The input ports 312, 314, 316 are used to receive a first image data. Specifically, each input port receives first image data from a corresponding image sensor 302, 304, and 306. For example, the input port 312 receives the first image data acquired by an image sensor 302 in a first image acquisition unit, and the input port 314 receives another first image data acquired by an image sensor 304 in a second image acquisition unit. The first image data may include a plurality of types of image data. The first image data includes at least a structured light image acquired under projection of structured light. The input switch 310 is coupled to the input ports 312, 314, 316 and is used to convey all or some of the first image data from the input ports 312, 314, 316. That is, the input switch 310 may convey all of the first image data from the input ports 312, 314, 316, or select and convey only some of the first image data from the corresponding input ports 312, 314, 316. The data processing engine 320 is coupled to the input switch 310 and is used to perform a calculation process on the first image data conveyed by the input switch 310 so as to output a second image data. The second image data includes at least a depth image. The data processing engine 320 includes at least a depth processing engine 322 used to perform a depth calculation process on the structured light image to generate the depth image.

In an embodiment of the present disclosure, referring to FIGS. 2A, 2B, and 3, the projector 23 projects a structured light pattern, such as a speckle pattern, onto a target space. The speckle pattern is projected onto a plane at a known distance from the depth camera. The speckle pattern is acquired by the first image acquisition unit 21 and is stored in the memory 24 as a reference speckle image. The memory can be a non-volatile memory, such as a flash memory. The flash memory may be included in the depth calculation processor 100, or may be a peripheral device connected to the depth calculation processor 100 through a flash memory interface. The reference speckle image may be read from the memory and input to the depth processing engine 320 through the input switch 310 or directly input to the depth processing engine 322 without going through the input switch 310. When there is a human body or other target objects in the target space, the projected speckle pattern may be modulated by the objects or the human body. A target speckle image (i.e., the structured light image in the first image data) of the target objects is obtained after the modulated speckle granular pattern is acquired by the first image acquisition unit 21. A horizontal offset between pixels of the target speckle image and corresponding pixels of the reference speckle image may exist. The depth calculation processor 100 receives the target speckle image from the first image acquisition unit 21, extracts the reference speckle image from the memory 24, and then calculates an offset value between the two images. The depth calculation processor 100 may further calculate a depth value $Z_D$ from a space point corresponding to each pixel in the target speckle image to the depth camera according to the offset value. A calculation formula is as follows:

$$Z_D = \frac{BfZ_0}{Bf - Z_0\Delta},$$

where B is a distance between the first image acquisition unit 21 and the projector 23, $Z_0$ is the depth value between the known plane and the depth camera when the reference speckle image is acquired, and f is a focal length of a lens in the first image acquisition unit 21. After $Z_D$ of each pixel of the target speckle image is calculated using the above formula, a corresponding depth map may be obtained. The depth image is output to a main device through the output port (corresponding to the transmission interface 25 of the depth camera 20) of the depth calculation processor 100.

Generally, an image acquisition unit includes elements such as image sensors and lenses. The image sensor is generally a complementary metal-oxide-semiconductor (CMOS) or a charge-coupled device (CCD). For example, the first image acquisition unit 21 includes elements such as an image sensor 210 and a lens. A surface of the image sensor 210 having light filters for corresponding pixels is used to extract intensity of light having different wavelengths, therefore the first image acquisition unit 21 can acquire invisible light images having different wavelengths. The wavelengths of the light allowed to be passed through the light filters of the image sensor 210 are the same as the wavelengths of the light source 230, such as infrared light or ultraviolet light. The second image acquisition unit 22 may use a Bayer filter to respectively obtain light intensity information of three channels (R, G, and B) to acquire a color image of the target object.

As shown in FIG. 2A, in some embodiments of the present disclosure, the depth camera 20 further includes a floodlight illuminator 26 such as a laser diode or a light-emitting diode (LED). In addition, wavelengths of light emitted by the floodlight illuminator 26 are the same as wavelengths of the light source 230. The floodlight illuminator 26 is coupled to the depth calculation processor 100, which controls the operations including turning on or off and the power of the floodlight illuminator 26. The floodlight illuminator 26 can be controlled to be synchronized with the image sensor to acquire a floodlight image.

In an embodiment of the present disclosure, the projector 23 in the depth camera 20 can be turned on simultaneously with the first image acquisition unit 21 and the second image acquisition unit 22. The target speckle image and the color image of the target object are simultaneously acquired using the first image acquisition unit 21 and the second image acquisition unit 22. The depth processing engine 322 in the depth calculation processor 100 perform a depth calculation process on the target speckle image to generate the depth map. An image registration engine 329 in the depth calculation processor 100 registers the generated depth map and the color image to form a registered mixed image, which is then output to the host device.

The depth processing engine 322 processing the input structured light image to obtain the depth map includes, but is not limited to, the following processes: (1) performing a depth calculation process on a reference image and a single structured light image to obtain the depth map; (2) performing a depth calculation process on obtained two structured light images to generate the depth map without a reference image; and (3) using two independent depth processing sub-engines to perform the depth calculation process on the structured light image based on two different reference images to obtain two depth maps, respectively, and using a depth map synthesis processing sub-engine to synthesize the two depth maps and generate the depth map.

Specifically, the depth calculation process generally includes a matching calculation, such as the depth calculation. A matching algorithm is used to calculate an offset value between each pixel in one image and a corresponding pixel in another image. The offset value is then used to calculate the depth information.

In addition, a color image processing engine 324 in the depth calculation processor 100 is used to perform a calculation process on color image data acquired by the second image acquisition unit so as to output a color image (such as an red-green-blue (RGB) image or a YUV image). A plurality of calculation methods may be used in the calculation process. For example, only one channel of the color image data acquired by the second image acquisition unit is transmitted to the color image processing engine 324, and the color image processing engine 324 processes this one channel of image to form a color image in a specific format having three-channel data, such as in an RGB format or a YUV format. Therefore, the depth camera 20 shown in FIG. 2A may output not only the depth map through the transmission interface but also the registered mixed image, such as the RGB image or the YUV image.

FIG. 2B shows another depth camera 30 according to an embodiment. The depth camera 30 shown in FIG. 2B differs from the depth camera 20 in FIG. 2A in that the depth camera 30 further includes a third image acquisition unit 33. The third image acquisition unit 33 and the first image acquisition unit 21 are respectively disposed on both sides of the projector 23, or can be located on the same side of the projector 23 according to another embodiments. When the two image acquisition units have same parameters, an active binocular vision may be implemented by the depth camera 30. For example, when the speckle pattern is projected to the target space by the projector 23, the first image acquisition unit 21 and the third image acquisition unit 33 acquire left and right target speckle images of the target object, respectively. A depth map may be obtained by calculating a pixel offset value between the two (left and right) target speckle images. In this mode, no reference speckle image is required. Compared with the active monocular vision implemented in the depth camera 20 shown in FIG. 2A, the depth map obtained by the depth camera 30 has better resistance to the ambient light. Therefore, the depth map has higher precision.

In another embodiment of present disclosure, the projector 23 can be combined with the first image acquisition unit 21 and the third image acquisition unit 33, respectively, so as to form two structured light image acquisition apparatus. These two structured light image acquisition apparatus may acquire two structured light images of the target object, which are provided to the depth calculation processor 100. The depth calculation processor 100 processes two structured light images with respective reference speckle images to generate two depth maps. Furthermore, the depth calculation processor 100 may include a synthesis processing sub-engine configured to synthesize the two depth maps into a single depth map. Compared with the active monocular vision implemented in the depth camera 20, the synthesized depth map has a higher resolution while avoiding a shadow problem in the depth image.

In some embodiments, the depth camera 30 may include a structured light image acquisition apparatus constituted by the third image acquisition unit 33 and the projector 23, and a floodlight image acquisition apparatus constituted by the first image acquisition unit 21 and the floodlight illuminator 26, for obtaining, for example, an infrared floodlight image. These two apparatuses are respectively controlled by a control unit 332 of the depth calculation processor 100. The first image acquisition unit 21 and the floodlight illuminator 26 are controlled to be simultaneously turned on to acquire the infrared floodlight image of the target object. The third image acquisition unit 33 and the projector 23 are controlled to be simultaneously turned on to acquire a structured light image of the target object. Alternatively, an invisible light image such as an infrared image may be acquired by the third image acquisition unit 33. The infrared image is provided to the depth calculation processor 100 for denoising and enhancement processes. Meanwhile, the infrared image is registered with the output (i.e., the depth map) of the depth processing engine 322 to obtain a mixed image.

In addition to the structures of the depth cameras 20 and 30 shown in FIG. 2A and FIG. 2B, a plurality of types of depth cameras are contemplated according to different requirements. For example, the depth camera 30 in FIG. 2B may not include the second image acquisition unit 22 which is used to acquire the color image data. Instead, it may include only the first and third image acquisition units used to acquire invisible light image data. For another example, to obtain front-facing and rear-facing depth images of the host device configured with a depth camera, a projector and an image acquisition unit are to be installed both in the front and at the back of the host device. The host device can use depth calculation processor 100 to obtain front-facing and back-facing depth maps simultaneously or individually. A depth calculation processor may have two independent depth processing engines use to perform the depth calculation process on the front-facing and rear-facing depth images, or may have one depth processing engine that processes both the front-facing and rear-facing depth images.

A device that includes the depth camera 20 or depth camera 30 is a 3D image device. The depth calculation processor 100 of the depth cameras can generate different types of the second image data including the depth image, the floodlight image, the registered mixed image, and the color image (such as the RGB image or the YUV image). The depth cameras can output the second image data through the transmission interface 25. In an embodiment of the present disclosure, the transmission interface 25 can be a universal serial bus (USB) interface. The depth calculation processor 100 can pack and compress the plurality of types of the second image data and output the same to another host device such as a computer or a game console, through the USB interface in a unified format. In another embodiment of the present disclosure, the transmission interface 25 can be a plurality of Mobile Industry Processor Interface (MIPI) output interfaces. A controller in the host device may control the depth calculation processor 100 in the depth camera to output a corresponding second image data to the host device through the MIPI output interfaces according to the requirement of an application. For example, the corresponding second image data is provided to an application processor of a host device (e.g., a mobile phone) for further processing to implement other functions.

Another form of the 3D image device is a mobile terminal having a depth camera according to an embodiment of the present disclosure. For example, the mobile phone 41 in FIG. 1 has a depth camera. The 3D image device in this specific form further includes an application processor, which generally has a stronger calculation capacity. For example, after a depth map, an RGB image, or an IR image (an infrared spectrum image) is received from the depth camera 42 (i.e., the depth camera 20 in FIG. 2A or the depth camera 30 in FIG. 2B), the application processor can process the image according to a particular program/function, such as performing one or more of a three-dimensional reconstruction, body posture and movement recognition, and object recognition, using a depth map. Thus, the mobile phone 41 can implement 3D scanning and recognition of the face of the user 43. In addition, the application processor may receive a RGB image and an invisible light image from the depth calculation processor 100, for biometric feature recognition such as an iris recognition, a face recognition, or lip-reading recognition. The programs, such as 3D scanning and recognition, are pre-stored in a non-volatile memory (e.g., a flash or a read-only memory) of the mobile phone 41. In some embodiments, there may be a plurality of types of data transmission interfaces between the depth camera 42 and the mobile phone 41. The depth camera can transmit image and video information independently or synchronously with one or multiple MIPI interfaces. According to an embodiment, the depth camera 42 is disposed on the mobile phone 41. However, in another embodiment, the depth camera may be separated from the host device. A data transmission interface between the depth camera and the host device may be a USB interface. A plurality of types of image and video information can be integrated, packed, and compressed in the depth camera, and then transmitted to the host device through the USB interface in a multiplex format.

A depth calculation processor has a plurality of functions and is applicable to a plurality of types of host devices. The depth calculation processor may be an independent dedicated chip or an internal IP core used as a SOC chip. In addition, a software algorithm that implements functions of the depth calculation processor also falls within the scope of the present disclosure. For example, other programmable processors (such as a field-programmable gate array (FPGA)) or computer software that implements the above functions shall fall within the protection scope of the present disclosure. To apply the depth calculation processor to the foregoing mentioned plurality of depth cameras, a plurality of input ports is needed and should be simultaneously coupled to the input switch. According to different depth camera application scenarios, the input switch can select and convey a first image data to the data processing engine for corresponding image process.

The depth calculation processor 100 further includes an output switch 340 connected between the output port 330 and the data processing engine 320, which is used to convey all or some of the second image data to the output port(s) 330. It should be noted that the image data to be conveyed may be selected by the input switch 310 or the output switch 340 according to a preset application scenario, or may be controlled or adjusted by a control unit 332.

The depth calculation processor 100 is further described below with reference to FIG. 3 and FIG. 4.

As shown in FIG. 3, each of the input ports (312, 314, 316) is coupled to a peripheral image sensor (302, 304, 306), so as to receive the first image data from the image sensor, respectively. These image sensors 302, 304, 306 correspond to the image sensors in the image acquisition units in the foregoing depth camera. Different types of images may be acquired by the individual image sensors. Therefore, the first image data from the individual input ports may be of different, correspondingly. For example, the first image data may include a structured light image acquired by the image sensor 302, a color image data acquired by the image sensor 304, and an infrared image data (which may be other invisible light image data) acquired under illumination of an invisible light floodlight by an infrared image sensor 306. It should be noted that, although three image sensors 302, 304, and 306 are illustrated to respectively receive the structured light image, the color image data, and the infrared image data, the present disclosure is not limited to this configuration. In some embodiments, a single image sensor may be employed to obtain a plurality of different types of image data at different moments. For example, if a structured light projector is used to project infrared light, the image sensor 302 may be used to acquire an infrared structured light image. If an infrared floodlight is used for illumination, the image sensor 302 may acquire the infrared image data. The data processing engine 320 includes a plurality of processing engines having different functions corresponding to a plurality of different types of the first image data. For example, the data processing engine 320 further includes one or more of an invisible light image processing engine 326, a color image processing engine 324, and an image registration engine 329.

The invisible light image processing engine (e.g., an infrared image processing engine 326 as illustrated in the example in FIG. 3) is used to perform a first calculation process on the invisible light image data in the first image data to generate an invisible light image. For example, when the invisible light image data is infrared image data, the invisible light image processing engine may perform de-noising and enhancement processes on the infrared image data. The color image processing engine 324 is used to perform a second calculation process on the color image data in the first image data to generate a color image, such as an RGB image or a YUV image. Correspondingly, the color image processing engine 324 may be used to perform a de-noising process on the color image data, or used to divide the color image data into three channels by interpolation and fitting to convert the data of the three channels into corresponding color image data, such as RGB or YUV. Other processing functions may be employed for the color image. For example, an enhancement processing may be performed on the input color image. The image registration engine 329 is used to register the infrared (or other invisible) image or the color image with the depth map. The image registration engine 329 generally is coupled to the depth processing engine 322, the invisible light image processing engine (e.g., 326), and the color image processing engine 324. The image registration engine 329 can be configured to receive the depth map, the invisible light image, or the color image, and to register the invisible light image or the color image with the depth map.

The depth calculation processor 100 further includes at least one bus which can be configured for data transmission between all the parts, and to control turning on/off and power of devices, such as the peripheral image sensors 302, 304, and 306, the projectors, and the memory 308. In one embodiment, as shown in FIG. 3, the depth calculation processor 100 has two buses, a first bus device 101 and a second bus device 102. The first bus device 101 is used to connect the peripheral devices to the depth calculation processor 100, and to connect to the second bus device 102 through a bridge 103. The control unit 332 is coupled to the second bus 102 to control the input switch 310, the output switch 330, and interfaces of the peripheral devices. As shown in FIG. 4, the first bus device 101 is an Advanced Peripheral Bus (APB), the second bus device 102 is an Advanced High-performance Bus (AHB), and the two buses are connected through an APB bridge 420. Specifically, an Inter-Integrated Circuit (I2C) can be employed to simultaneously turn on peripheral devices through the APB bus, or a pulse-width modulator (PWM) may be employed to power the peripheral devices through the APB bus. The peripheral devices may include, for example, image sensors 302, 304, and 306, a projection device 340 (e.g., the laser projector 402 in FIG. 4), and other apparatuses 342 including an infrared floodlight (i.e., the IR illustration 404 in FIG. 4) or a temperature control apparatus of Terminal Equipment Controller 406 (TEC). The control unit 332 is used to control the depth calculation processor 100, including the booting control, parameter configuration control, power control, interface control, and the like. As shown in FIG. 4, the control unit 332 is connected to an AHB bus (i.e., the second bus 102), which is connected to an APB bus (i.e., the first bus 101) through the APB bridge 420. Therefore, the control unit 332 may control all parts of the depth calculation processor 100, the peripheral devices, and the interfaces. In other embodiments, the buses may be in other forms.

In an embodiment of the present disclosure, a bus is configured to connect the control unit 332 for controlling all parts. For example, the control unit 332 is connected to the second bus device 102, which is connected to both the input switch 310 and the output switch 340, such that the control unit 332 may control the input switch 310 and the output switch 340 through the second bus device 102. For another example, according to an actual application requirement, the input switch 310 may be controlled to select the required first image data for the data processing engine 320. The output switch 340 may select a data output from the data processing engine 320, or selectively output the data to an output port 330. In some embodiments of the present disclosure, how the input switch 310 and the output switch 340 select data to be conveyed may not be completely controlled by the control unit 332, and may be preset according to a specific application scenario of the depth calculation processor 100.

Figure 4:
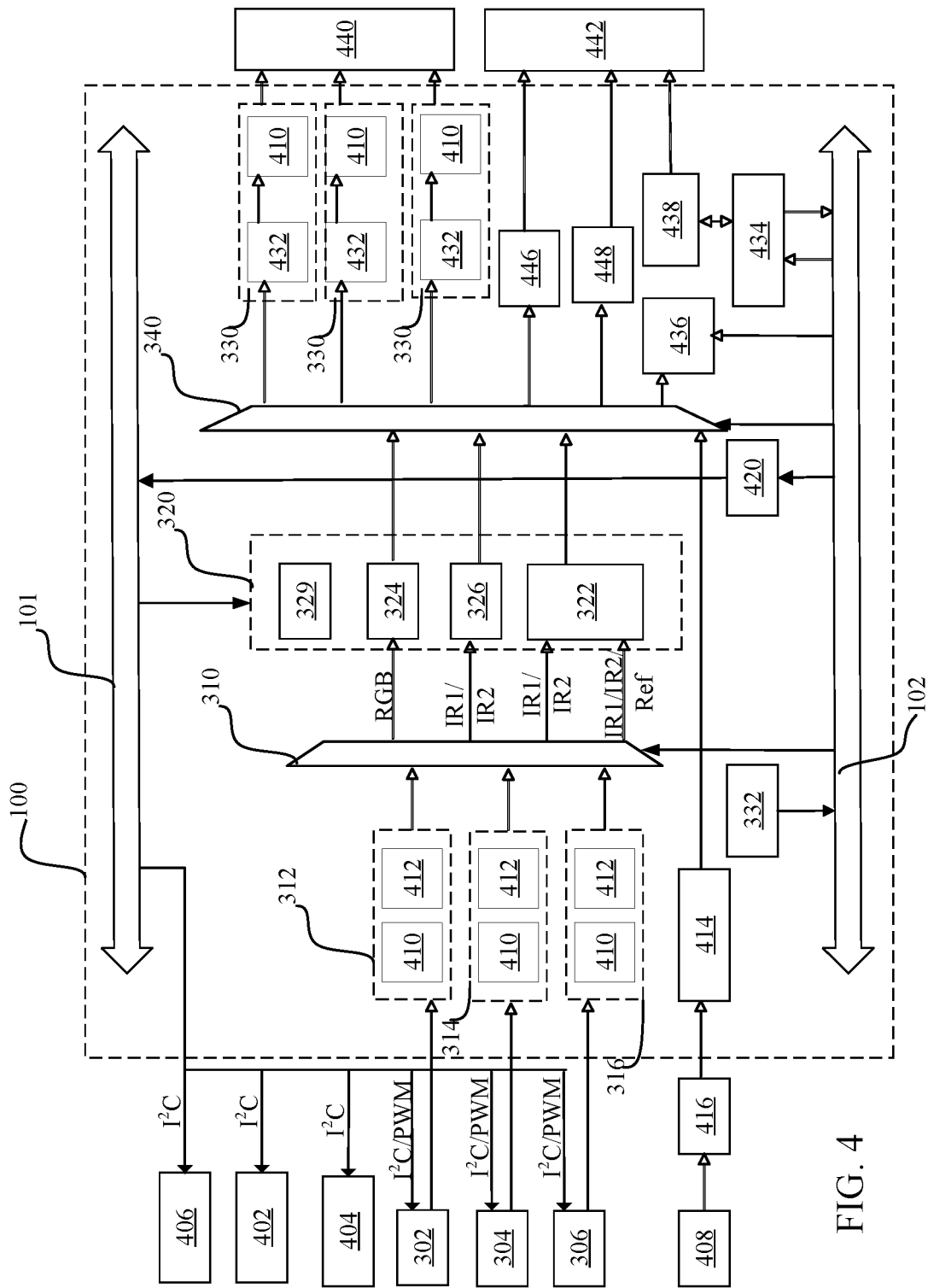
FIG. 4 is a detailed block diagram of a depth calculation processor according to an embodiment of the present disclosure.

FIG. 4 is a detailed exemplary architecture of the depth calculation processor 100 shown in FIG. 3. In the depth calculation processor 100, the functional elements may be provided on a semiconductor substrate, and are connected through routing. This dedicated integrated circuit has advantages of small size and low power consumption. The depth calculation processor 100 is externally connected through a plurality of pins. The pins are configured to be different types of ports according to different functions. For example, the input and output ports may use interfaces such as a Digital Video Port (DVP), a MIPI, a USB, a Digital Visual Interface (DVI)/High-Definition Multimedia Interface (HDMI) 446, a Bayonet Neill-Concelman (BNC)/RJ-45 interface 448. Transmission through other types of interfaces is possible but not described herein.

In a specific example shown in FIG. 4, the depth calculation processor 100 is provided with three input ports 312, 314, and 316, which are all MIPI interfaces. In another embodiment of the present disclosure, the depth calculation processor 100 may include DVP interfaces. The input ports 312, 314, and 316 may be connected to two infrared image sensors IR1 CMOS (e.g., the image sensor 302) and IR2 CMOS (e.g., the image sensor 304) and a color image sensor RGB CMOS (e.g., the image sensor 306), respectively. The input ports 312, 314, and 316 receive different first image data from the image sensors 302, 304, and 306 connected thereto. When the depth calculation processor 100 is applied to different depth cameras, the three input ports 312, 314, and 316 may be selectively connected to the image sensors 302, 304, and 306. For example, for the depth camera shown in FIG. 2A, only two input ports are connected to an infrared image sensor and a color image sensor, respectively. However, for the depth camera shown in FIG. 2B, three input ports are connected to the three image sensors IR1 CMOS, IR2 CMOS, and RGB CMOS, as shown in FIG. 4.

In the example shown in FIG. 4, the MIPI interface includes a MIPI D-physical layer (PHY) interface 410 and a second generation camera high-speed serial interface CSI-2, in which data transmission on a physical layer is defined on the D-PHY. A structure of the CSI-2 generally includes a packing/unpacking layer, a protocol layer, and a channel management layer. The CSI-2 can be divided into a CSI-2RX receiving end 412 and a CSI-2TX transmitting end 432 according to data transmission paths between the three layers. In the input ports 312, 314, and 316, the CSI-2 may be the CSI-2RX receiving end 412 for receiving data from the image sensors 302, 304, and 306. In the output ports 330, the CSI-2 may be the CSI-2TX transmitting end 432 for sending second image data to a main device (e.g., a mobile phone 440). An image data transmission path extends from the channel management layer to the protocol layer to the unpacking layer. The channel management layer is used to segment and reassemble a data stream according to a channel output requirement. The legal protocol layer adds a packet header and a packet trailer to a data according to a particular protocol specification. The packing/unpacking layer reassembles and packs the acquired pixel point information stream or unpacks it in a particular sequence.

As shown in FIG. 4, the input switch 310 is connected between the MIPI input interfaces and the data processing engine 320. A function of the input switch 310 is to selectively convey the data from the MIPI input interfaces for various different applications. In addition, the input switch 310 is further used to transmit the image data to a corresponding image processing engine (such as the infrared image processing engine 326, the color image processing engine 324, or the depth processing engine 322 shown in FIG. 4). In an embodiment of the present disclosure, the three input ports 312, 314, 316 may receive data, but only two of the three ports are required by a current application. Therefore, the input switch 310 may selectively output the data from the two required input ports. Specific functions of the input switch 310 to be implemented may be preset. For example, when the depth calculation processor 100 is disposed in the depth camera shown in FIG. 2A, the input switch 310 is preset to allow only the data inputs from two of the three input ports. Alternatively, the control unit 332 may control and adjust the data inputs.

In the embodiment shown in FIG. 4, the depth processing engine 322 is used to receive an infrared image transmitted by the infrared image sensor 302 or 304 and a reference image to calculate a depth map. Distinguished from a general infrared image, the infrared image herein is a structured light image, and is an infrared image of a target acquired under illumination of structured light (such as infrared light having a fixed pattern). The reference image may be interpreted as a structured light image acquired by an image sensor when a structured light pattern is projected onto a plane at a known distance from the image sensor. The calculation methods have been described above and will not repeated herein. For example, for the depth camera shown in FIG. 2A, the depth processing engine 322 receives an infrared image acquired under projection of the structured light and a reference image to perform depth image calculation. The reference image may be stored in a flash memory. The flash memory may be included in the depth calculation processor 100, or may be connected to the depth calculation processor 100 as a peripheral device through a flash memory interface. For another example, as shown in FIG. 3, the memory 308, as a peripheral device, is connected to the depth calculation processor 100 through a storage interface 318. For another example, the memory may be connected to the second bus device 102. When required, the reference image may be read and provided to the depth processing engine 322 through the input switch 310. Or the reference image may be read by a reference image reader 328 via the second bus device 102, and sent to the depth processing engine 322 without passing through the input switch 310.

The depth calculation processor 100 shown in FIG. 4 may be applied to the depth camera shown in FIG. 2B. In one case, a depth map can be obtained without a reference image. The depth processing engine 322 can directly read two infrared images acquired under projection of the structured light to calculate a depth map. An offset value between each pixel in one image and a corresponding pixel in another image is calculated and used to calculate the depth information to obtain the depth map. In another case, two reference images may be employed to respectively calculate two depth maps. For this case, the depth processing engine 322 may be designed as two independent engine units configured to calculate the two depth maps as described above.

The second image data is output to the outside (e.g., a main device) from an output port 330 after being processed by the data processing engine 320. The output ports may be configured with any interfaces that can transmit data such as a video and an image. For example, the interfaces may include an MIPI, a USB, a DVI, an HDMI, a BNC, and an RJ45. The output interfaces are connected to the output switch, which selects a second image data for outputting through the plurality of output ports. A same group of the second image data may be output to different host devices through the plurality of output interfaces simultaneously. For example, depth image may be simultaneously output to a mobile phone and a computer through two respective MIPI output interfaces. In an embodiment, one or more of the output interfaces may be directly connected to the data processing engine. A specific connection manner is not limited in the present disclosure.

In the detail architectural diagram shown in FIG. 4, each of the engines in the data processing engine 320 is coupled to the output switch 340 and then is coupled to the output ports 330 through the output switch 340. The output switch 340 is used to select one or more second image data received from the processing engines according to a current application. For example, if the current application requires only a color image, the output switch 340 selects the data from the color image processing engine 324 and outputs the data through the MIPI output interface 330. In an embodiment, the data is output to another application processor, such as an application processor of a mobile phone 440. In another embodiment, a plurality of second image data may be simultaneously output by CSI-2 TX controllers 432 and MIPI D-PHYs 410. One or more MIPI output interfaces 330 may be formed by the CSI-2 TX controllers 432 and the MIPI D-PHYs 410.

Referring to FIG. 4, the second image data output from each processing engine of the data processing engine 320 may be transmitted to a USB FIFO 436. As shown in FIG. 2, in some embodiments, the depth calculation processor 100 may receive audio data from the host device. For example, an Internet Information Services (IIS) receiver 414 receives the audio data. A stereo microphone 408 converts the audio data into a digital format through a Analog-Digital converter 416 (ADC), and then audio data is transmitted to the USB FIFO 436. The USB FIFO 436 is used to buffer data. In addition, various types of data are packed and transmitted to a host machine 442 via an AHB bus to an USB interface. The USB interface includes a USB controller 434 and a USB PHY interface 438. When the data in the USB FIFO 436 is ready, the USB controller 434 accesses the AHB bus to read a prepared data packet.

The depth calculation processor 322 can include a plurality of input ports that are used to receive a plurality of types of image data. The input image data is selected or combined by the input switch 310 for the data processing engine 320 to perform calculation process. For different types of image data and different combinations of image data, the data processing engine 320 may perform different calculation and output a plurality of different images, so as to implement a plurality of functions and adapt to different main devices. The depth calculation processor 322 of the present disclosure is applicable to a plurality of main devices. Compared with a main device with a plurality of single functioned processors, an overall size and power consumption of the host device are reduced.

In the foregoing descriptions, the image data is generally input, processed, and output in a video stream form. In an embodiment, the depth calculation processor, especially the depth processing engine, may receive the data in a row-by-row or column-by-column manner. Similarly, the depth calculation processor may calculate the data sequentially in row-by-row or column-by-column manner to obtain depth information. This processing method is more efficient and does not need excessive data buffers in the depth calculation processor.

Although the present disclosure is described in details with reference to specific preferred embodiments, it shall be considered that the specific embodiments of this application is not limited to these descriptions. A person skilled in the art should understand that several equivalent replacements or obvious variations made without departing from the principle of the present disclosure and having same performance or applications shall fall within the protection scope of the present disclosure.

What is claimed is:

1. A depth calculation processor, comprising:
   at least two input ports configured to receive a first image data, wherein the first image data comprises at least a structured light image acquired under projection of a structured light;
   an input switch coupled to the input ports and configured to convey all or some of the first image data from the input ports;
   a data processing engine coupled to the input switch and configured to perform a calculation process on the first image data that is output through the input switch so as to output a second image data, wherein the second image data comprises at least a depth map, wherein the data processing engine comprises at least a depth processing engine configured to perform a depth calculation process on the structured light image to obtain the depth map; and
   at least an output port coupled to the data processing engine and configured to output the second image data to a host device.

2. The depth calculation processor according to claim 1, further comprising an output switch coupled between the output port and the data processing engine, and configured to convey all or some of the second image data to the output port.

3. The depth calculation processor according to claim 2, further comprising a first bus device and a second bus device, wherein:
   the first bus device is configured to control a peripheral device coupled to the depth calculation processor, and to connect to the second bus device through a bridge; and
   the second bus device is coupled to a control unit, wherein the control unit manages the input switch, the output switch, and an interface of the peripheral device, through the second bus device.

4. The depth calculation processor according to claim 1, wherein:
   each of the input ports is coupled to an image sensor to receive the first image data from the image sensor, respectively, and the first image data comprises one or more of a color image data and an invisible light image data acquired under illumination of an invisible light floodlight; and the data processing engine comprises one or more of an invisible light image processing engine, a color image processing engine, and an image registration engine, wherein the invisible light image processing engine is configured to perform a first calculation process on the invisible light image data to output an invisible light image, the color image processing engine is configured to perform a second calculation process on the color image data to output a color image, and the image registration engine is configured to register one or more of the invisible light image and the color image with the depth map.

5. The depth calculation processor according to claim 1, wherein the depth processing engine performs the depth calculation process on the structured light image based on a reference image and a single structured light image to obtain the depth map.

6. The depth calculation processor according to claim 1, wherein the depth processing engine performs the depth calculation process on the structured light image based on two structured light images to obtain the depth map.

7. The depth calculation processor according to claim 1, wherein:

the depth processing engine comprises two independent depth processing sub-engines, wherein the two independent depth processing sub-engines perform the depth calculation process on the structured light image based on two different reference images to obtain two different depth maps, respectively; and the depth processing engine comprises a depth map synthesis processing sub-engine configured to synthesize the two different depth maps to generate the depth map.

8. The depth calculation processor according to claim 1, wherein:

the input ports comprise one or more of a Mobile Industry Processor Interface (MIPI) interface and a Digital Video Port (DVP) interface; and the output port comprises one or more of a MIPI interface and a universal serial bus (USB) interface.

9. A data processing method, comprising:

independently receiving a first image data from different image sensors through at least two input ports, wherein the first image data comprises at least a structured light image acquired under projection of a structured light;

selectively receiving the first image data from the input ports;

performing a calculation process on the first image data to obtain a second image data; and outputting the second image data to a host device through at least one output port, wherein performing the calculation process on the first image data comprises performing a depth calculation process on the structured light image to obtain a depth map.

10. The data processing method according to claim 9, wherein:

the first image data comprises one or more of a color image data and an invisible light image data acquired under illumination of an invisible light floodlight; and performing the calculation process on the first image data comprises one or more of perform a first calculation process on the invisible light image data to generate an invisible light image;

perform a second calculation process on the color image data to generate a color image;

registering the invisible light image with the depth map; and registering the color image with the depth map.

11. The data processing method according to claim 9, wherein performing the depth calculation process on the first image data is based on a reference image and a single structured light image, or based on two structured light images.

12. The data processing method according to claim 9, wherein performing the depth calculation process on the first image data comprises:

performing the depth calculation process on the structured light image through two independent parallel processing channels based on two different reference images to obtain two depth maps; and synthesizing two depth maps to generate the depth map.

13. A three-dimensional (3D) image device, comprising:

a depth calculation processor;

a projector coupled to the depth calculation processor and configured to generate a structured light pattern under control of the depth calculation processor, the structured light pattern being projected to a target object; and a first image acquisition unit coupled to the depth calculation processor and configured to acquire a structured light image of the target object and output the structured light image to the depth calculation processor, wherein the depth calculation processor includes:

at least two input ports configured to receive the structured light image;

an input switch coupled to the input ports and configured to convey all or some of the structured light image from the input ports;

a data processing engine coupled to the input switch and configured to perform a calculation process on the structured light image to generate an output image, wherein the output image includes a depth map and wherein the data processing engine comprises at least a depth processing engine configured to perform a depth calculation process on the structured light image to obtain the depth map; and at least an output port coupled to the data processing engine and configured to output the output image to a host device.

14. The 3D image device according to claim 13, further comprising a second image acquisition unit coupled to the depth calculation processor and configured to acquire and output a color image data of the target object to the depth calculation processor; wherein the depth calculation processor performs the calculation process on the color image data to output a color image or a first mixed image based on the color image data, wherein the first mixed image is generated by registering the color image with the depth map.

15. The 3D image device according to claim 14, further comprising an application processor coupled to an output port of the depth calculation processor and configured to further process an image data output from the depth calculation processor.

16. The 3D image device according to claim 15, wherein the application processor is configured to perform one or more of a three-dimensional reconstruction, a body posture and movement recognition, or an object recognition, using the depth map.

17. The 3D image device according to claim 15, wherein the application processor is configured to recognize one or more of an iris, a face, or lip-reading, using the color image.

18. The 3D image device according to claim 13, further comprising a third image acquisition unit coupled to the depth calculation processor and configured to acquire the structured light image of the target object; wherein the first image acquisition unit and the third image acquisition unit acquire and output a left structured light image and a right structured light image of the target object to the depth calculation processor, respectively, wherein the depth calculation processor is configured to:
- calculate a pixel offset value between the left structured light image and the right structured light image and generate the depth map based on the pixel offset value; or
- calculate a first pixel offset value between the left structured light image and a respective reference image and a second pixel offset value between the right structured light image and a respective reference image, generate two depth maps based on the first pixel offset value and the second pixel offset value, and synthesize the two depth maps to form the depth map.

19. The 3D image device according to claim 13, further comprising a third image acquisition unit coupled to the depth calculation processor and configured to acquire and output an invisible light image data of the target object to the depth calculation processor, wherein the depth calculation processor performs the calculation process on the invisible light image data to output an invisible light image or a second mixed image based on the invisible light image data, wherein the second mixed image is generated by registering the invisible light image with the depth map.

20. The 3D image device according to claim 19, further comprising an application processor coupled to an output port of the depth calculation processor and configured to further process an image data output from the depth calculation processor, wherein the application processor is configured to recognize one or more of an iris, a face, or lip-reading, using the invisible light image.

* * * * *